(12) United States Patent
Hirukawa et al.

(10) Patent No.: US 12,410,739 B2
(45) Date of Patent: Sep. 9, 2025

(54) VEHICLE MONITORING DEVICE AND VEHICLE MONITORING METHOD

(71) Applicant: Komatsu Ltd., Tokyo (JP)

(72) Inventors: Kouji Hirukawa, Tokyo (JP); Tomoharu Hori, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/717,496

(22) PCT Filed: Nov. 15, 2022

(86) PCT No.: PCT/JP2022/042346
§ 371 (c)(1),
(2) Date: Jun. 7, 2024

(87) PCT Pub. No.: WO2023/106046
PCT Pub. Date: Jun. 15, 2023

(65) Prior Publication Data
US 2025/0027435 A1    Jan. 23, 2025

(30) Foreign Application Priority Data
Dec. 9, 2021  (JP) .................. 2021-199970

(51) Int. Cl.
*F01N 11/00*  (2006.01)
*F01N 3/20*  (2006.01)

(52) U.S. Cl.
CPC .......... *F01N 11/00* (2013.01); *F01N 3/2066* (2013.01); *F01N 2900/1806* (2013.01)

(58) Field of Classification Search
CPC . F01N 11/00; F01N 3/2066; F01N 2900/1806
See application file for complete search history.

(56) References Cited

U.S. PATENT DOCUMENTS

| | | | |
|---|---|---|---|
| 2009/0037046 A1* | 2/2009 | Teramura | F02D 41/22 701/33.4 |
| 2015/0300232 A1* | 10/2015 | Matsumoto | F01N 11/00 701/34.4 |

FOREIGN PATENT DOCUMENTS

| | | | |
|---|---|---|---|
| JP | 2006-291730 A | | 10/2006 |
| JP | 2009-036165 A | | 2/2009 |
| JP | 2009-127521 A | | 6/2009 |
| JP | 2010106812 A | * | 5/2010 |
| WO | 2015/025542 A1 | | 2/2015 |

OTHER PUBLICATIONS

Machine translation of JP 2010106812 A (Year: 2010).*

* cited by examiner

*Primary Examiner* — Brandon D Lee
(74) *Attorney, Agent, or Firm* — Troutman Pepper Locke LLP

(57) ABSTRACT

A vehicle monitoring device includes: a recurrence monitoring unit configured to, when an error that has occurred in an exhaust gas aftertreatment device is resolved, monitor recurrence of the error for a predetermined recurrence monitoring period; an output limiting unit configured to limit output of an internal combustion engine when the error recurs during the recurrence monitoring period; and a monitoring control unit configured to perform control to enable end of monitoring of the recurrence monitoring unit in a predetermined manufacturing process.

5 Claims, 5 Drawing Sheets

VEHICLE MONITORING DEVICE AND VEHICLE MONITORING METHOD

TECHNICAL FIELD

The present disclosure relates to a vehicle monitoring device and a vehicle monitoring method.

Priority is claimed on Japanese Patent Application No. 2021-199970, filed Dec. 9, 2021, the content of which is incorporated herein by reference.

BACKGROUND ART

As disclosed in Patent Document 1, it is known that an error warning related to an exhaust gas aftertreatment device, such as a concentration of a urea aqueous solution or a residual amount of the urea aqueous solution, is issued depending on whether or not a vehicle is in an exhaust gas regulation area where use of the exhaust gas aftertreatment device is recommended. In addition, in recent years, after the error related to the exhaust gas aftertreatment device occurs, when the same error occurs again within a certain period (recurrence monitoring period) after the error is resolved, illegal use is limited by limiting output of an engine.

CITATION LIST

Patent Document

[Patent Document 1] Japanese Unexamined Patent Application, First Publication No. 2009-127521

Summary of Invention

Technical Problem

In manufacturing a vehicle body, the error related to the exhaust gas aftertreatment device may occur due to defective assembly, defective connection of wiring, or the like. When recurrence monitoring is performed based on the occurrence of such an error, the output of the engine may be limited even in the case of a new vehicle immediately after shipment.

An object of the present disclosure is to provide a vehicle monitoring device and a vehicle monitoring method capable of preventing output of an engine from being limited immediately after shipment.

Solution to Problem

According to a first aspect of the present disclosure, a vehicle monitoring device includes: a recurrence monitoring unit configured to, when an error that has occurred in an exhaust gas aftertreatment device is resolved, monitor recurrence of the error for a predetermined recurrence monitoring period; an output limiting unit configured to limit output of an internal combustion engine when the error recurs during the recurrence monitoring period; and a monitoring control unit configured to perform control to enable end of monitoring of the recurrence monitoring unit in a predetermined manufacturing process.

Advantageous Effects of Invention

According to the above aspect, it is possible to prevent a vehicle from being shipped in a state where recurrence monitoring is being performed.

DESCRIPTION OF EMBODIMENTS

Embodiment

<<Work Machine>>

Figure 1:
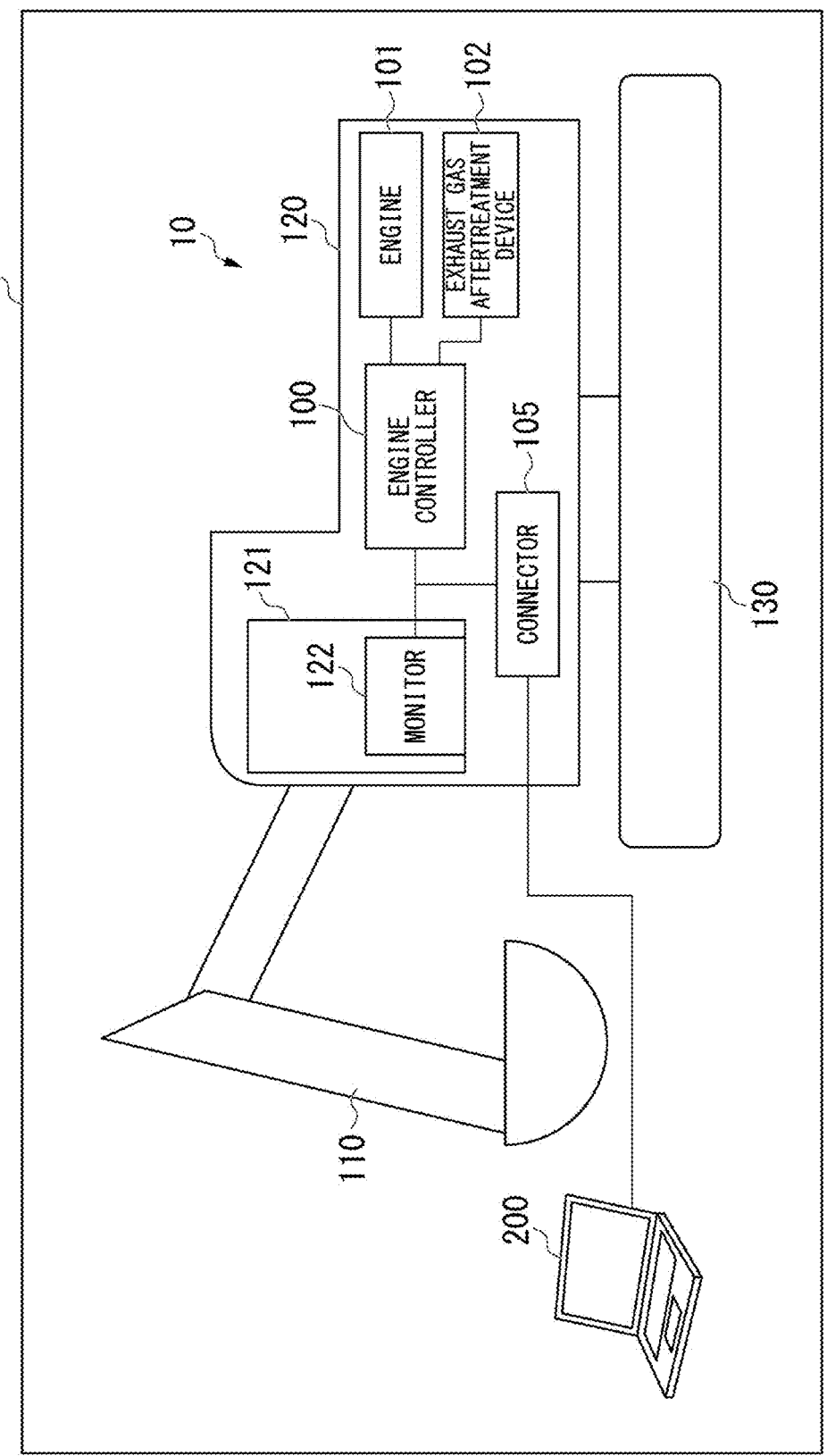
FIG. 1 is a schematic diagram showing a configuration of a work machine according to an embodiment.

FIG. 1 is a schematic diagram showing a configuration of a work machine according to an embodiment.

A work machine 10 is a machine being in a manufacturing process in a manufacturing factory 1. The work machine 10 is a machine that performs various work at a work site (for example, a mine or a quarry). For example, the work machine 10 is a hydraulic excavator. The work machine 10 may be a work machine such as a wheel loader or a bulldozer other than the hydraulic excavator. The work machine 10 includes work equipment 110 that hydraulically operates, a swing body 120 that supports the work equipment 110, and an undercarriage 130 that supports the swing body 120.

The swing body 120 includes a cab 121. The cab 121 is provided with a monitor 122. The monitor 122 displays various kinds of information. Specifically, the monitor 122 displays various kinds of information related to the state of an engine 101 and various kinds of information related to the state of an exhaust gas aftertreatment device 102 under the control of an engine controller 100. In addition, the monitor 122 is a touch panel display unit that receives various kinds of information from a user.

The work machine 10 includes the engine controller 100, the engine 101, the exhaust gas aftertreatment device 102, and a connector 105.

The engine controller 100 (engine control unit (ECU)) controls the engine 101 and the exhaust gas aftertreatment device 102.

The engine 101 is an example of an internal combustion engine. The engine 101 is, for example, a diesel engine.

The exhaust gas aftertreatment device 102 includes a urea aqueous solution tank and a urea selective catalytic reduction (SCR). The urea aqueous solution tank is a tank in which a urea aqueous solution that is a precursor of a reducing agent (ammonia) is stored. The urea SCR removes nitrogen oxide (NOx) contained in exhaust gas of the engine 101. Specifically, in the urea SCR, the urea aqueous solution in the urea aqueous solution tank is used and is injected and supplied to the exhaust gas according to the operation state of the engine. By injecting and supplying the urea aqueous solution, the urea SCR performs reduction reaction between NOx in the exhaust gas and the reducing agent on a reduction catalyst and performs purification treatment such that NOx is purified into a harmless component (nitrogen gas and water vapor).

The connector 105 is an interface that is connected to an external operation device (for example, an operation terminal device 200). The connection with the operation terminal device 200 may be wired or wireless. In addition, the connection with the operation terminal device 200 may be made via a network such as the Internet.

The operation terminal device 200 is disposed in the manufacturing factory 1. The operation terminal device 200 is a computer device that is operated by a manufacturing staff for the work machine 10. The operation terminal device 200 is, for example, a notebook computer. The operation terminal device 200 is not limited to the notebook computer, and may be a desktop computer, a tablet terminal, a smartphone, or the like. The operation terminal device 200 is connected to the engine controller 100 via the connector 105.

<<Inducement Control>

The exhaust gas aftertreatment device 102 detects various errors. The various errors include, for example, an error related to the quality of the urea aqueous solution in the urea aqueous solution tank, an error related to shortage of the urea aqueous solution in the urea aqueous solution tank, and an error related to a failure of the urea SCR. When an error is detected by the exhaust gas aftertreatment device 102, the engine controller 100 issues a warning of the error. Then, when the error is resolved, the engine controller 100 performs monitoring of the error for a predetermined period from the resolution of the error as a recurrence monitoring period.

When the same error occurs again during the recurrence monitoring period, the engine controller 100 performs inducement control of stepwise limiting output of the engine. When the same error does not occur again during the recurrence monitoring period, the inducement control is ended. The recurrence monitoring period can be freely adjusted in accordance with the regulations of respective countries. In the present embodiment, the recurrence monitoring period is, for example, 40 hours.

Figure 2:
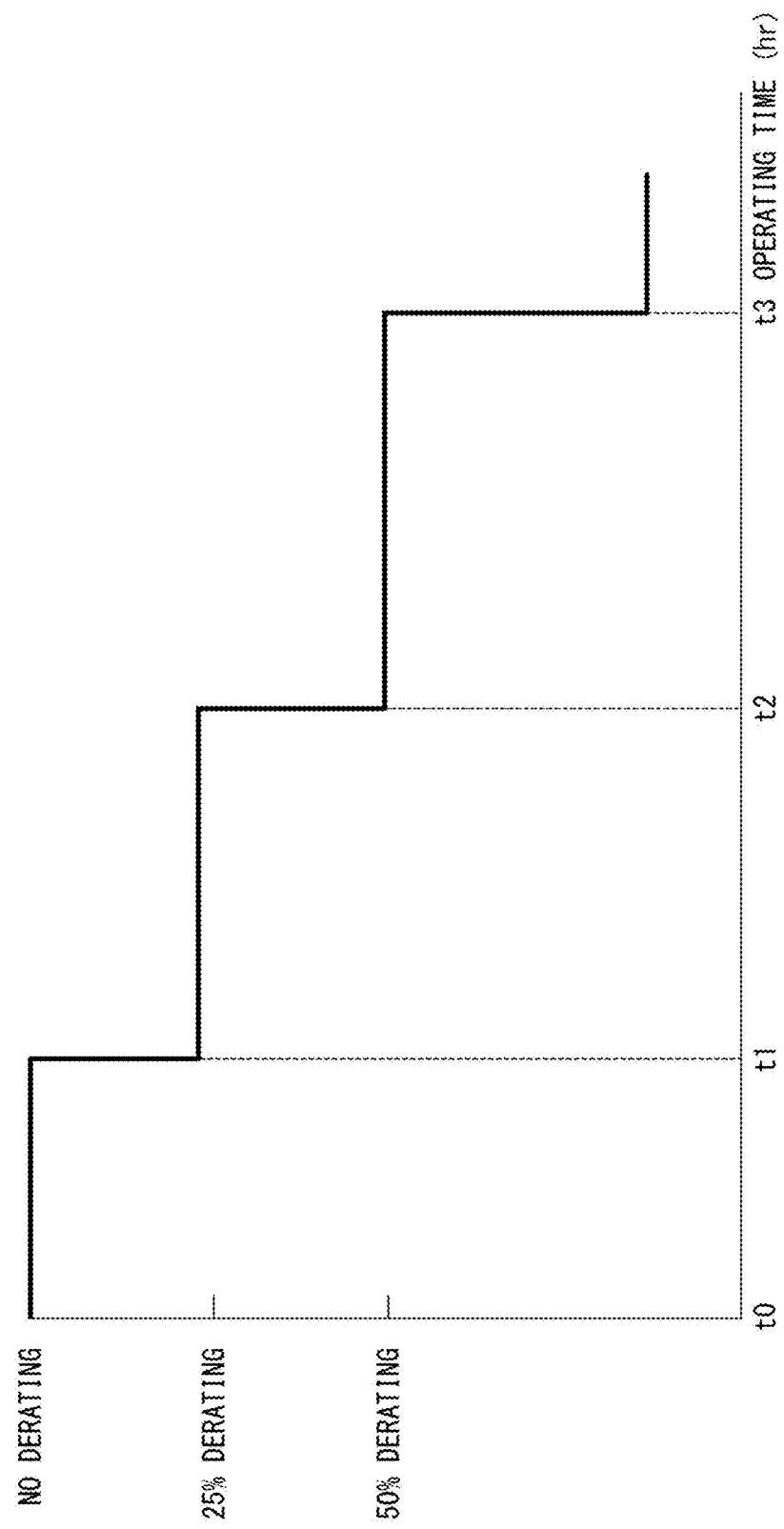
FIG. 2 is an explanatory diagram showing an example of inducement control.

FIG. 2 is an explanatory diagram showing an example of the inducement control. In FIG. 2, a horizontal axis represents an operating period of time (hr) after the error of the engine 101 is resolved, and a vertical axis represents derating for limiting the output of the engine. Time t0 indicates a timing when the error is resolved. No derating is performed at time to. It is assumed that the same error as the previously resolved error recurs at time t1. In this case, derating in which the output of the engine 101 is reduced by 25% is performed.

Further, when the engine 101 continues to be used as it is, and time t2 is reached, derating in which the output of the engine 101 is reduced by 50% is performed. Further, when the engine 101 continues to be used as it is, and time t3 is reached, derating in which the output of the engine 101 is reduced to an idle state is performed. When the same error does not recur during the recurrence monitoring period, the recurrence monitoring period is canceled. Times t1, t2, and t3 and the reduction percentage of the derating can be set to values according to the regulations of respective countries.

<<Functional Configuration of Work Machine>>

Figure 3:
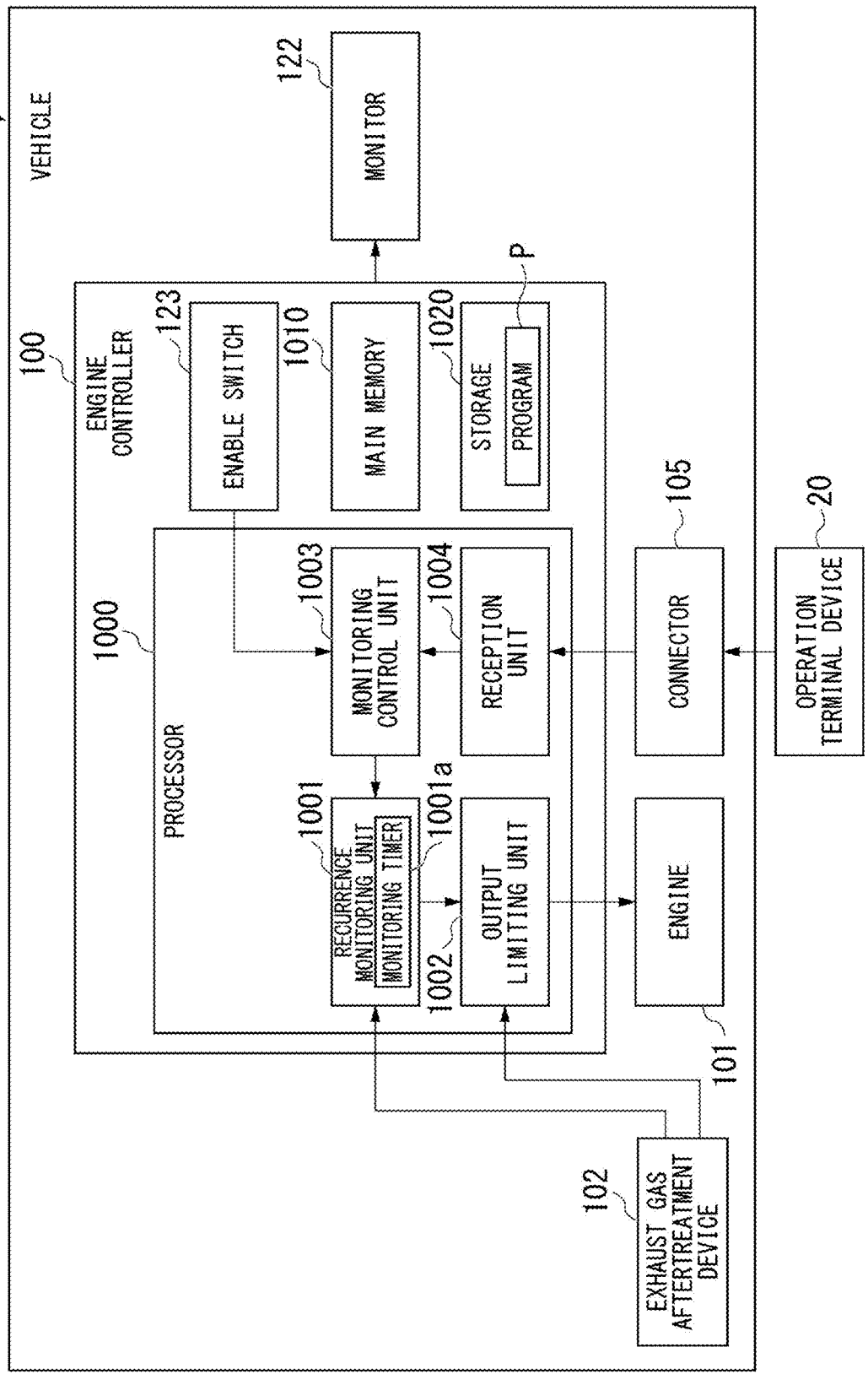
FIG. 3 is a schematic block diagram showing a functional configuration of a work machine 10 according to the embodiment.

FIG. 3 is a schematic block diagram showing a functional configuration of the work machine 10 according to the embodiment.

The engine controller 100 of the work machine 10 is a computer including a processor 1100, a main memory 1010, and a storage 1020. The storage 1020 stores a program P. The processor 1000 reads the program P from the storage 1020, loads the program P to the main memory 1010, and executes processing according to the program P. The engine controller 100 is connected to a network via the connector 105 (reception unit).

The storage 1020 has a storage area. Examples of the storage 1020 include an HDD, an SSD, a magnetic disk, a magneto-optical disk, a CD-ROM, a DVD-ROM, and a semiconductor memory. The storage 1020 may be an internal medium directly connected to a common communication line of the engine controller 100 or may be an external medium connected to the engine controller 100 via an interface. The storage 1020 is a non-transitory and tangible storage medium.

The processor 1000 is an example of a vehicle monitoring device. The processor 1000 includes a recurrence monitoring unit 1001, an output limiting unit 1002, a monitoring control unit 1003, and a reception unit 1004 by executing the program P.

When an error that has occurred in the exhaust gas aftertreatment device 102 is resolved, the recurrence monitoring unit 1001 monitors recurrence of the same error as the previously resolved error for a predetermined recurrence monitoring period. The recurrence monitoring unit 1001 includes a monitoring timer 1001*a*. The recurrence monitoring unit 1001 sets the recurrence monitoring period by starting measurement of the monitoring timer 1001*a*. The recurrence monitoring period is not limited to being obtained by the measurement of the monitoring timer 1001*a*, and may be obtained from, for example, a difference between a time when the error is resolved and a current time.

The monitoring timer 1001*a* is provided for each error type. That is, the recurrence monitoring period is set for each error type. The recurrence monitoring unit 1001 sets the recurrence monitoring period for each error type by starting the measurement of the monitoring timer 1001*a* provided for each error type.

The output limiting unit 1002 limits the output of the engine 101 when the same error as the previously resolved error recurs within the recurrence monitoring period. It is only necessary that the limitation of the output of the engine 101 is limitation according to the regulations of respective countries. In the present embodiment, the limitation of the output of the engine 101 is the derating control in the inducement control as shown in FIG. 2.

Here, in an engine-related manufacturing process, an error related to the exhaust gas aftertreatment device 102 may occur due to defective assembly, defective connection of wiring, or the like. The engine-related manufacturing process is a process that is performed after the engine 101 itself is manufactured, and is, for example, a process of attaching various sensors to the engine 101 or a process of performing various adjustments on the engine 101. In addition, the engine-related manufacturing process includes a process of mounting the engine 101 on a vehicle body and a process of mounting the exhaust gas aftertreatment device on the vehicle body. The engine-related manufacturing process is an example of a predetermined manufacturing process.

In the engine-related manufacturing process, even when an error occurs, a work staff can immediately deal with the error, and thus the error can be resolved. However, since the recurrence monitoring period is set when the error is resolved, the vehicle may be shipped in a state where the recurrence monitoring period is set. Therefore, the output of the engine 101 may be limited even in the case of a new vehicle after shipment.

Therefore, the monitoring control unit 1003 performs control to enable end of the monitoring of the recurrence monitoring unit 1001 in the engine-related manufacturing process. Specifically, performing control to enable end of the monitoring of the recurrence monitoring unit 1001 means performing control to enable cancel of the recurrence monitoring period set in the recurrence monitoring unit 1001. The monitoring control unit 1003 determines whether or not the current manufacturing process of the work machine 10 is the engine-related manufacturing process. This determination is, for example, determination as to whether or not a cumulative operating time during which the work machine 10 has operated after the engine 101 is manufactured is within a predetermined period of time (for example, within 10 hours).

The monitoring control unit 1003 performs control to enable end of the monitoring of the recurrence monitoring unit 1001 when the cumulative operating time during which the engine 101 (work machine 10) has operated after the manufacture of the engine 101 is within the predetermined period of time. 10 hours (T) as the predetermined period of time is a period of time considering a cumulative operating time (T1) that can be expected until completion of the engine-related manufacturing process and a cumulative operating time (T2) that can be expected until completion of other manufacturing processes to be performed subsequently. Specifically, T1<T<T2 is satisfied.

This will be specifically supplemented. The cumulative operating time T1 that can be expected until the completion of the engine-related manufacturing process is within 10 hours. When the engine-related manufacturing process is completed, the process proceeds to a subsequent manufacturing process such as a vehicle body-related manufacturing process. Since performance inspection or the like is performed from the start of the subsequent manufacturing process until the shipment, the cumulative operating time T2 exceeds 10 hours. Here, as described above, an error related to the exhaust gas aftertreatment device 102 may occur in the engine-related manufacturing process. On the other hand, in the subsequent manufacturing process and thereafter, an error related to the exhaust gas aftertreatment device 102 is less likely to occur. Therefore, the predetermined period of time T is set to be longer than the cumulative operating time T1 that can be expected until the completion of the engine-related manufacturing process, and is set to be shorter than the cumulative operating time T2 that can be expected until the completion of other manufacturing processes up to the shipment stage. Accordingly, it is possible to perform control to enable end of the monitoring of the recurrence monitoring unit 1001 before shipment from the manufacturing factory 1, particularly in the engine-related manufacturing process. The predetermined period of time is not limited to 10 hours, and may be set to another period of time.

The determination as to whether or not the current manufacturing process is the engine-related manufacturing process is not limited to being performed by measuring the cumulative operating time, and may be performed based on, for example, position information. Specifically, for example, it is only necessary that the monitoring control unit 1003 acquires information on the current location of the vehicle body using a global navigation satellite system (GNSS) and determines whether or not the current location is a position where the engine-related manufacturing process is performed.

When the operation terminal device 200 receives an instruction to cancel the recurrence monitoring period from an operator (manufacturing staff), the operation terminal device 200 transmits a reset signal as a cancellation instruction (end instruction) to the connector 105. The reset signal is transmitted by a communication protocol of Unified Diagnostic Services (UDS). In addition, the reset signal is encrypted.

The connector 105 is an interface that accepts connection of a communication cable. The engine controller 100 receives the encrypted reset signal from the operation terminal device 200 via a communication line. The reset signal does not have to be encrypted. The connector 105 outputs the reset signal received from the operation terminal device 200 to the reception unit 1004. The reception unit 1004 outputs the reset signal input from the connector 105 to the monitoring control unit 1003.

The monitoring control unit 1003 decrypts the reset signal using a password prepared in advance or an algorithm such as an Advanced Encryption Standard (AES) scheme. The reset signal is not limited to being acquired through reception from the operation terminal device 200, and may be acquired through reception from an input device (not shown). The input device includes various devices such as an operation button, a keyboard, and a touch panel. The monitoring control unit 1003 cancels the monitoring period set in the recurrence monitoring unit 1001 based on the reset signal. Specifically, the monitoring control unit 1003 ends the measurement of the monitoring timer 1001*a*. The monitoring control unit 1003 also ends the recurrence monitoring period in a case where the same error does not occur again within the recurrence monitoring period.

The monitoring control unit 1003 performs control to disable the end of the monitoring based on the reset signal after the engine-related manufacturing process is completed. That is, when the cumulative operating time exceeds a predetermined period of time (10 hours), the monitoring control unit 1003 disables cancellation of the recurrence monitoring period set in the recurrence monitoring unit 1001. As a result, after the shipment from the factory, the recurrence monitoring period cannot be canceled. In addition, the cumulative operating time is a period of time that cannot be reset.

An enable switch 123 is a switch for switching a reset function of the inducement control. Countries in which the work machine 10 is used include a country in which the reset of the inducement control is allowed and a country in which the reset is not allowed according to the regulations. Therefore, in the present embodiment, the reset function of the inducement control is made switchable to comply with the regulations of respective countries. The enable switch 123 is setting information indicating enabling/disabling of the reset function stored in the engine controller 100.

That is, the enable switch 123 is a switch for making it possible to disable the reset function when the reset function is not permitted to be used by the regulations. The enable switch 123 may be set only at the time of manufacturing and may not be able to be switched later. Accordingly, it is possible to prevent unauthorized use by the user resetting the enable switch in a country where the reset of the inducement control is not allowed.

<<Method>>

Here, a method of setting the recurrence monitoring period performed by the engine controller 100 according to the embodiment will be described.

Figure 4:
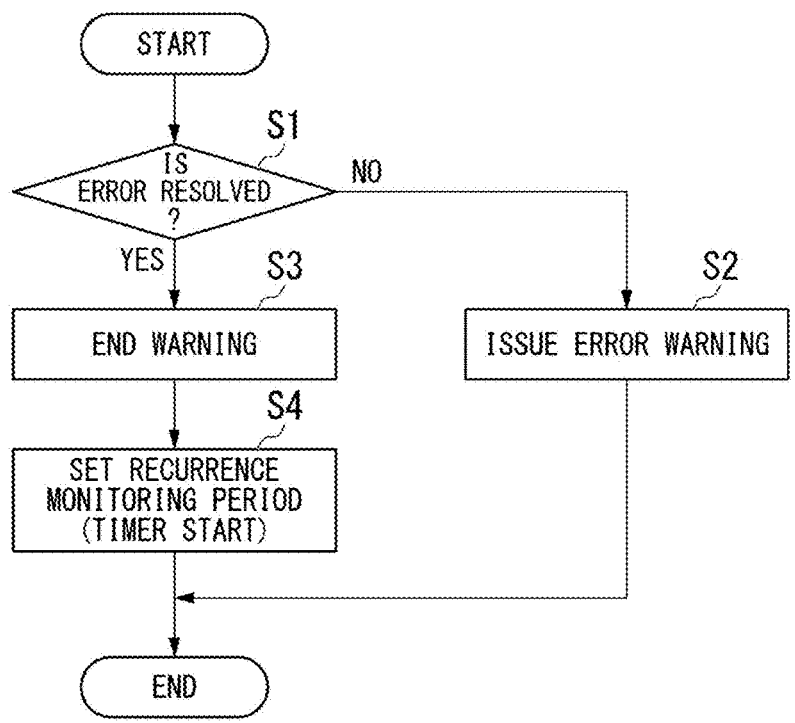
FIG. 4 is a flowchart showing a method of setting a recurrence monitoring period performed by an engine controller 100.

FIG. 4 is a flowchart showing a method of setting the recurrence monitoring period performed by the engine controller 100. The processing shown in FIG. 4 is repeatedly executed in a predetermined calculation cycle.

The engine controller 100 determines whether or not an error that has occurred in the exhaust gas aftertreatment device 102 is resolved (step S1). When the error is not resolved (step S1: NO), the engine controller 100 issues a warning of the error according to the error type (step S2) and ends the processing shown in FIG. 4.

When the occurred error is resolved (step S1: YES), the engine controller 100 ends the warning of the error (step S3). The recurrence monitoring unit 1001 of the engine controller 100 starts the measurement of the monitoring timer 1001a provided for each error type to set the recurrence monitoring period (step S4), and ends the processing shown in FIG. 5.

Figure 5:
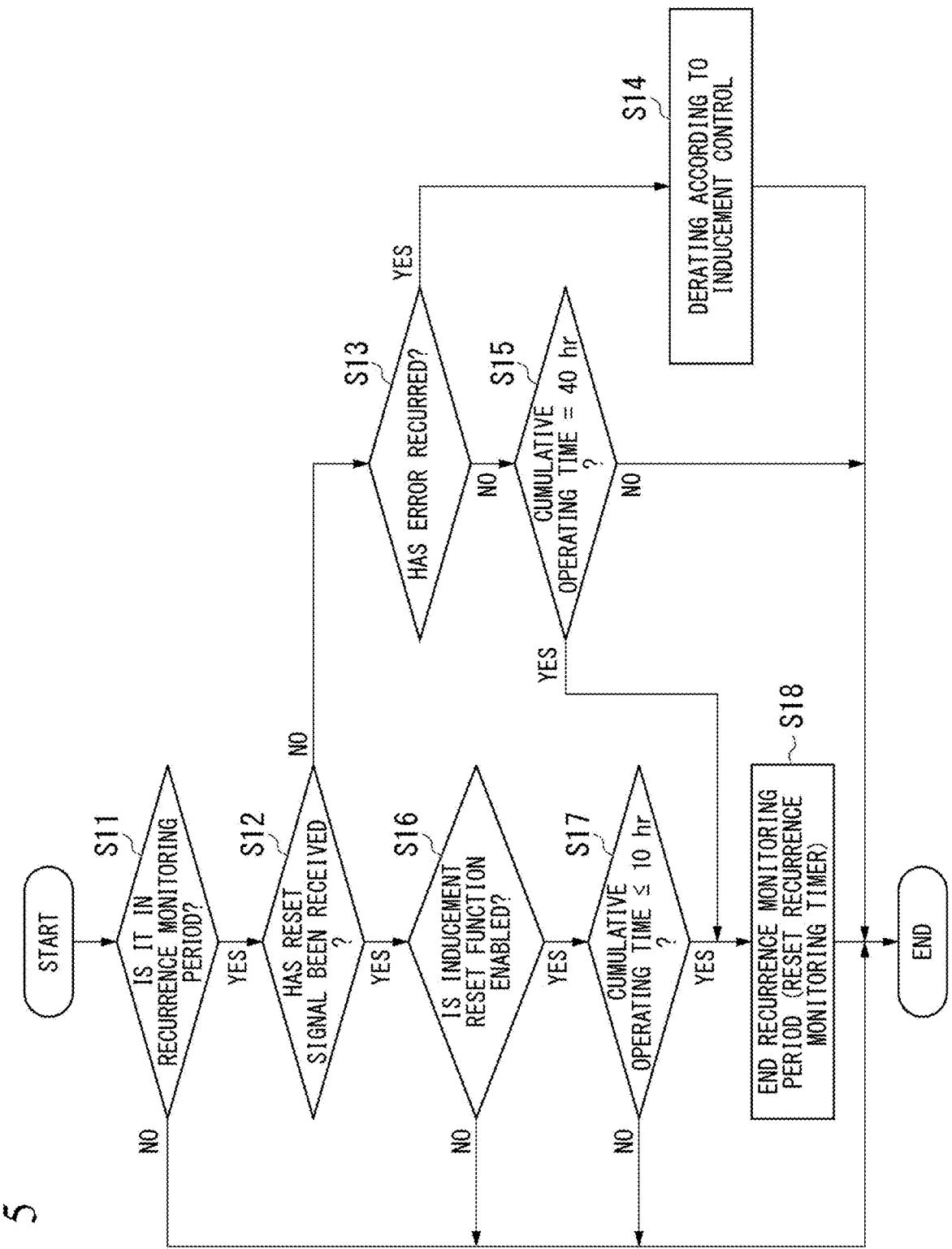
FIG. 5 is a flowchart showing a control method during the recurrence monitoring period performed by the engine controller 100.

FIG. 5 is a flowchart showing a control method during the recurrence monitoring period performed by the engine controller 100. The processing shown in FIG. 5 is repeatedly executed in a predetermined calculation cycle.

The monitoring control unit 1003 determines whether or not the recurrence monitoring period is in progress (step S11). When the recurrence monitoring period is not in progress (step S11: NO), the engine controller 100 ends the processing shown in FIG. 5. When the recurrence monitoring period is in progress (step S11: YES), the reception unit 1004 determines whether or not the reset signal for ending the recurrence monitoring period has been received from the operation terminal device 200 (step S12).

When the reset signal has not been received (step S12: NO), the output limiting unit 1002 determines whether or not the error has recurred in the exhaust gas aftertreatment device 102 (step S13). When the error has recurred (step S13: YES), the output limiting unit 1002 performs the derating according to the inducement control (step S14). On the other hand, when the error has not recurred (step S13: NO), the monitoring control unit 1003 determines whether or not the cumulative operating time has exceeded 40 hours (step S15).

When the cumulative operating time does not exceed 40 hours (step S15: NO), the engine controller 100 ends the processing shown in FIG. 5. On the other hand, when the cumulative operating time exceeds 40 hours (step S15: YES), the monitoring control unit 1003 proceeds to step S18 to end the recurrence monitoring period.

In step S12, when the reset signal is received (step S12: YES), the monitoring control unit 1003 determines whether or not the inducement reset function is enabled by the enable switch 123 being turned on (step S16). When the reset signal is received, the monitoring control unit 1003 decrypts the reset signal. When the inducement reset function is disabled (step S16: NO), the engine controller 100 ends the processing shown in FIG. 5.

On the other hand, when the inducement reset function is enabled (step S16: YES), the monitoring control unit 1003 determines whether or not the cumulative operating time is 10 hours or less (step S17). When the cumulative operating time exceeds 10 hours (step S17: NO), that is, when the engine-related manufacturing process has already been completed, the engine controller 100 ends the processing shown in FIG. without ending the recurrence monitoring period.

On the other hand, when the cumulative operating time is 10 hours or less (step S17: YES), that is, when the current manufacturing process is the engine-related manufacturing process, the monitoring control unit 1003 ends the recurrence monitoring period by resetting the measurement of the monitoring timer 1001a (step S18) and ends the processing shown in FIG. 5.

<<Actions and Effects>>

As described above, according to the embodiment, the engine controller 100 performs control to enable end of the monitoring of the recurrence monitoring unit 1001 in a predetermined manufacturing process after the manufacture of the engine 101. Accordingly, even when an error related to the exhaust gas aftertreatment device 102 occurs due to defective assembly, a defective connection of the wiring, or the like in the predetermined manufacturing process, and the recurrence monitoring period is set based on the error, the vehicle can be prevented from being shipped in a state where the recurrence monitoring is being performed. Therefore, it is possible to prevent the output of the engine 101 from being limited in the case of a new vehicle after shipment. In addition, according to the embodiment, the recurrence monitoring period set in the recurrence monitoring unit 1001 can be canceled in a short period of time without requiring a new component.

In addition, according to the embodiment, the engine controller 100 enables cancel of the recurrence monitoring period when the cumulative operating time during which the engine 101 has operated after being manufactured is within a predetermined period of time (10 hours). Accordingly, it is possible to easily determine whether or not the current manufacturing process is a predetermined manufacturing process (engine-related manufacturing process).

In addition, according to the embodiment, the monitoring of the recurrence monitoring unit 1001 is ended based on the reset signal (cancellation instruction) received from the operation terminal device 200. Accordingly, it is possible to easily end the monitoring using the operation terminal device 200. In addition, since the reset signal is encrypted, it is possible to ensure security and to prevent abuse in the market.

In addition, according to the embodiment, the monitoring control unit 1003 performs control to disable the end of the monitoring based on the reset signal when the predetermined manufacturing process is completed. Accordingly, it is possible to prevent the end of the monitoring based on the reset signal after shipment. Therefore, it is possible to appropriately perform the inducement control after shipment.

Another Embodiment

Although the embodiment has been described above in detail with reference to the drawings, the specific configuration is not limited to the above, and various design changes and the like can be applied thereto.

In the engine controller 100 according to the above-described embodiment, a case where the program P is stored in the storage 1020 has been described, but the present disclosure is not limited thereto. For example, the program P may be distributed to the engine controller 100 via a communication line. In this case, the engine controller 100 that has received the distribution loads the program P to the main memory 1010 and executes the above processing.

The program P may realize a part of the above-described functions. For example, the program P may realize the above-described functions in combination with another program stored in the storage 1020 or in combination with another program installed on another device.

In addition to or instead of the above configuration, the engine controller 100 may include a programmable logic device (PLD). Examples of the PLD include a programmable array logic (PAL), a generic array logic (GAL), a complex programmable logic device (CPLD), and a field programmable gate array (FPGA). In this case, a part of the functions realized by the processor 1000 may be realized by each PLD.

In addition, the engine controller 100 may include a plurality of processors 1100 or may be configured of a plurality of computers.

INDUSTRIAL APPLICABILITY

It is possible to prevent a vehicle from being shipped in a state where recurrence monitoring is being performed.

REFERENCE SIGNS LIST

1: Manufacturing factory
10: Work machine
100: Engine controller
101: Engine
102: Exhaust gas aftertreatment device
105: Connector
122: Monitor
123: Enable switch
1000: Processor
1001: Recurrence monitoring unit
1001a: Monitoring timer
1002: Output limiting unit
1003: Monitoring control unit
1004: Reception unit

The invention claimed is:

1. A vehicle monitoring device comprising:
a processor configured to:
 from a time an error that has occurred in an exhaust gas aftertreatment device is resolved, monitor recurrence of the error for a predetermined recurrence monitoring period;
 limit output of an internal combustion engine when the error recurs during the recurrence monitoring period; and
 perform control to enable end of monitoring the recurrence of the error when a vehicle is in a predetermined manufacturing process.

2. The vehicle monitoring device according to claim 1, wherein the processor is configured to determine that the vehicle is in the predetermined manufacturing process when a cumulative operating time during which the internal combustion engine has operated after being manufactured is within a predetermined period of time.

3. The vehicle monitoring device according to claim 1, wherein the processor is configured to:
 receive an end instruction to end the monitoring from an external operation device, and
 end the monitoring based on the end instruction.

4. The vehicle monitoring device according to claim 3, wherein the processor is configured to perform control to disable the end of the monitoring based on the end instruction when the predetermined manufacturing process is completed.

5. A vehicle monitoring method executed by a vehicle monitoring device, the method comprising:
 from a time an error that has occurred in an exhaust gas aftertreatment device is resolved, monitoring recurrence of the error for a predetermined recurrence monitoring period;
 limiting output of an internal combustion engine when the error recurs during the recurrence monitoring period; and
 performing control to enable end of monitoring the recurrence of the error when a vehicle is in a predetermined manufacturing process.

* * * * *